(No Model.)

B. DRILLER.
BAND CUTTER AND FEEDER FOR THRASHING MACHINES.

No. 307,381. Patented Oct. 28, 1884.

Attest:
Charles Pickles
Victor A. Lewis

Inventor:
B. Driller
By Knight Bros
Attys

United States Patent Office.

BANNAD DRILLER, OF ST. CHARLES, MISSOURI, ASSIGNOR OF ONE-HALF TO GEORGE TEIMMERNIAR, OF SAME PLACE.

BAND-CUTTER AND FEEDER FOR THRASHING-MACHINES.

SPECIFICATION forming part of Letters Patent No. 307,381, dated October 28, 1884.

Application filed May 9, 1884. (No model.)

*To all whom it may concern:*

Be it known that I, BANNAD DRILLER, of St. Charles, in the county of St. Charles and State of Missouri, have invented a certain new and useful Improvement in Band-Cutters and Feeders for Thrashing-Machines, of which the following is a full, clear, and exact description, reference being had to the accompanying drawings, forming part of this specification, and in which—

Figure 1:
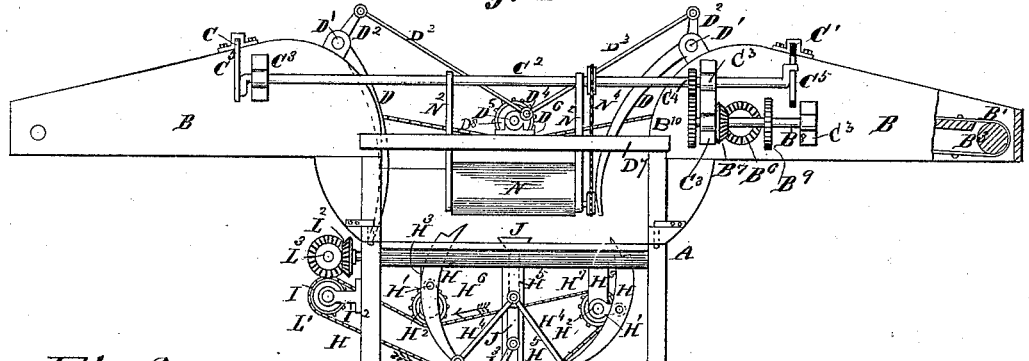
Figure 2:
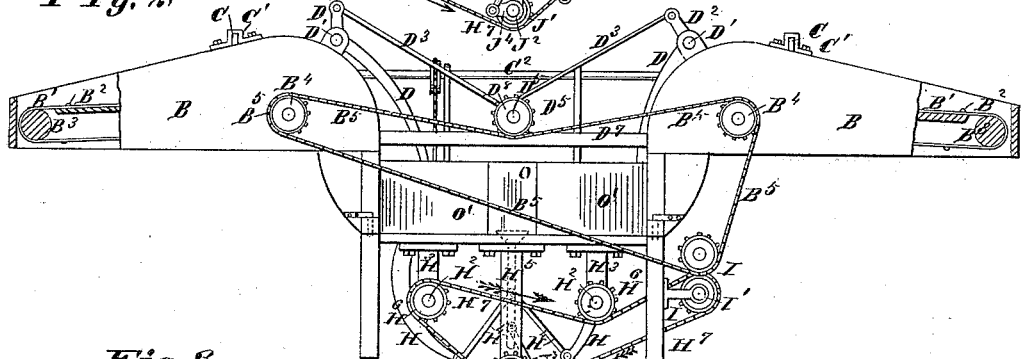
Figure 3:
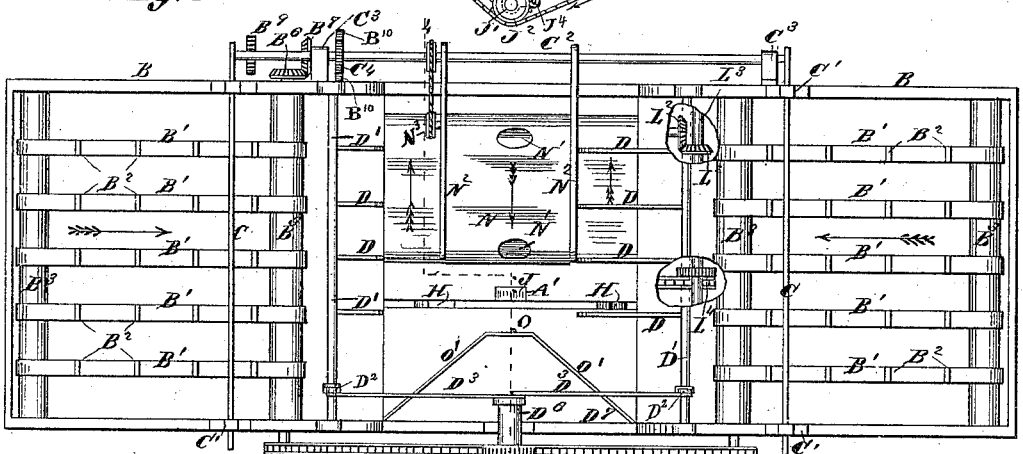
Figure 4:
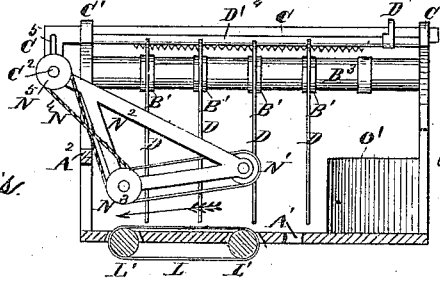

Figure 1 is an inside view from one end. Fig. 2 is an outside view from the other end. Fig. 3 is a top view, and Fig. 4 is a vertical section, of the upper part of the apparatus, taken on line 4 4, Fig. 3, the jumper being omitted.

My present invention relates to an improvement on the device shown and described in Letters Patent of the United States granted to me February 5, 1884, No. 293,155; and my present invention consists in features of novelty hereinafter fully described, and pointed out in the claims.

Referring to the drawings, A represents the cradle and B the wings of the apparatus, which are arranged and located relatively to the thrashing-machine, as set forth in the patent above mentioned.

Instead of having aprons on the wings, as shown and described in the patent, belts $B'$ are used. They have projections $B^2$ to engage the straw and carry it to the cradle, and they are supported on and operated by rollers $B^3$, journaled in the sides of the wings. The inner rollers of the two wings are provided at one end with chain-wheels $B^4$, connected by a chain-belt, $B^5$, (see Figs. 2 and 3,) and one of these rollers has on its other end (see Figs. 1 and 3) a miter-wheel, $B^6$, engaged by a similar wheel, $B^7$, on a short transverse shaft, $B^8$, on which is also a wheel or pulley, $B^9$, connected by suitable means to the machine or other motive power, and through this described connection the belts $B'$ are made to travel in the direction shown by the arrows.

C represents the saws or knives for cutting the bands, which are arranged vertically or edge down instead of horizontally or side down, as shown in my patent referred to. They are supported in brackets $C'$, secured to the edges of the wings, and they are reciprocated endwise by a crank-shaft, $C^2$, supported in bearings $C^3$, secured to the sides of the wings (see Fig. 1) and connected to the short shaft $B^8$ by gear-wheels $C^4$ and $B^{10}$. The saws or cutters have projections or enlargements $C^5$ on their ends, which are slotted to receive the cranks of the shaft $C^2$.

D represents the fingers for retaining the straw as it falls from the wings, which are operated alternately, for the purpose fully described in my patent referred to. They are secured to shafts $D'$, one on each wing, which have cranks $D^2$, connected by means of rods $D^3$ to a crank, $D^4$, on one end of a short shaft, $D^5$, journaled in a box, $D^6$, secured to a cross-piece, $D^7$, or other suitable support. (See Fig. 1.) On the other end of a shaft is a chain-wheel, $D^8$, with which the chain-belt $B^5$ engages, as shown in Fig. 2, and thus the fingers are operated alternately.

H represents the arms, arranged for the purpose specified in my said patent; but instead of pushing they pull the material into the cradle. They are supported on cranks $H'$, secured to shafts $H^2$, journaled in hangers $H^3$, depending from the cradle. Their lower ends are made fast by means of rods $H^4$ to a bracket or hanger, $H^5$, secured to the bottom of the cradle. Secured to the other ends of the shafts $H^2$ are wheels $H^6$, driven to operate the arms by a chain or belt, $H^7$, which also passes around a wheel, I, on a shaft, $I'$, journaled in boxes or brackets $I^2$, secured to the cradle and around or under a wheel, $J^2$, on a shaft, $J'$, journaled in the lower end of the hanger $H^5$.

J represents the "jumper" arranged for the purpose stated in the said patent; but it consists of a single piece working in a slot in the hanger or bracket $H^5$, and connected by means of a link or rod, $J^3$, to a crank, $J^4$, on the shaft $J'$, and thus it is moved up and down when the apparatus is at work. The jumper works through an opening, $A'$, in the bottom of the cradle. (See Fig. 4.)

L represents the apron on the bottom of the cradle for carrying the stuff to the mouth of the machine. It is supported on rollers $L'$, one of which is connected by means of miter-wheels $L^2$ to the shaft $L^3$, connected to the shaft I' by gear-wheels L⁴. (See Fig. 3.) The shaft L³ is properly supported in bearings secured to the cradle. If desired, another apron, N, may be arranged above apron L, to assist in moving the straw to the machine. It is supported on rollers N', journaled in a frame, N², supported by the shaft C², to which it is secured, and bearing against a cross-piece, A², of the cradle. On one of the rollers is a wheel or pulley, N³, connected by means of a suitable belt, N⁴, to a similar wheel or pulley, N⁵, on the shaft C², and thus this belt is turned in the same direction as that L. (See arrow, Fig. 4.)

O represents a fender, to keep the stuff from the outer end of the cradle. It is provided with oblique wings O' O', to deflect the stuff toward the jumper and onto the apron at the bottom of the cradle.

I claim as my invention—

1. In a band-cutter and feeder, the combination, with the cradle, wings, carriers, jumper, and delivery-apron, of the fender O, having oblique wings O' O', to deflect the stuff toward the jumper and delivery-apron, as set forth.

2. In a band-cutter and feeder, the combination, with the cradle and wings, of the carrier-rollers B³, chain-wheels B⁴, driving-shaft connections for said rollers, shafts D', on each wing, having fingers D, and cranks D², short shaft D⁵, mounted in suitable bearing, and having chain-wheel D⁸, and crank D⁴, rods D³ connecting the cranks, and a chain-belt coupling the chain-wheel D⁸ with the chain-wheels B⁴, as set forth.

3. In a band-cutter and feeder, the combination, with the cradle, of the hangers H³ H³ and H⁵, depending from the cradle, arms H for drawing the material into the cradle, shafts H², journaled in the outer hangers and having cranks on which the arms are supported, rods H⁴, secured to the central hanger and supporting the lower ends of the arms, chain-wheels H⁶ on the shafts, shaft I', having bearings on the cradle, a chain-wheel, I, and a chain connecting the chain-wheels, as set forth.

4. In a band-cutter and feeder, the combination, with a cradle, of the hanger H⁵, having a slot, jumper J, working in said slot, shaft J', journaled in the lower end of the hanger, chain-wheel J², and crank J⁴, on said shaft, rod J³, connecting the crank with the jumper, and a chain to connect the chain-wheel with the driving-shaft, as set forth.

5. In a band-cutter and feeder, the combination, with the cradle and delivery-apron at the bottom thereof, of the upper apron, N, frame N², having rollers N', shaft C², supporting the frame, and pulleys and belt connecting one of the rollers with the shaft, as set forth.

BANNAD DRILLER.

In presence of—
 GEO. H. KNIGHT,
 SAML. KNIGHT.